US005532580A

United States Patent [19]

Shu et al.

[11] Patent Number: 5,532,580

[45] Date of Patent: Jul. 2, 1996

[54] CIRCUIT FOR WEIGHTED ADDITION

[75] Inventors: Guoliang Shu; Weikang Yang; Wiwat Wongwarawipat; Makoto Yamamoto, all of Tokyo, Japan

[73] Assignees: Yozan, Inc., Tokyo; Sharp Corporation, Osaka, both of Japan

[21] Appl. No.: 259,168

[22] Filed: Jun. 13, 1994

Related U.S. Application Data

[63] Continuation of Ser. No. 964,144, Oct. 21, 1992, abandoned.

[30] Foreign Application Priority Data

Oct. 20, 1992 [JP] Japan .................................... 4-306467

[51] Int. Cl.[6] .................................................. G05B 24/02

[52] U.S. Cl. .......................... 323/354; 323/367; 323/370

[58] Field of Search ............................ 330/69, 147, 277; 328/156, 157, 14; 327/361, 355, 427, 594, 353, 354, 367, 370

[56] References Cited

U.S. PATENT DOCUMENTS

| | | | |
|---|---|---|---|
| 4,799,026 | 1/1989 | La Barge et al. | 330/147 |
| 5,167,005 | 11/1992 | Yamakawa | 364/807 X |
| 5,363,070 | 11/1994 | Arimoto | 323/354 X |
| 5,389,872 | 2/1995 | Erhart et al. | 323/354 |

OTHER PUBLICATIONS

Pelly et al. "Power MOSFETs take the load off switching supply design", Electronic Design, Feb. 17, 1983, pp. 135–139.

Handbook for the most Use of Analog IC, Hardware Design Series, CQ Publishing Kabushiki Kaisha, 1992, pp. 135–142.

Electric Engineering Handbook, Electricity Society, 1975, pp. 1703–1704 and 1710.

*Primary Examiner*—Peter S. Wong
*Assistant Examiner*—Y. Jessica Han
*Attorney, Agent, or Firm*—Cushman, Darby & Cushman

[57] ABSTRACT

A circuit for weighted addition which includes a transistor having a gate and a plurality of resistance elements. Each resistance element has a first and second end. The first end of each resistance element is impressed with a voltage, and the second end of each resistance element is connected to the gate of the transistor. The circuit is small in size and renders precise and various types of weighted addition possible.

28 Claims, 3 Drawing Sheets

CIRCUIT FOR WEIGHTED ADDITION

This is a continuation of U.S. application No. 07/964,144, filed on Oct. 21, 1992, which was abandoned.

FIELD OF THE INVENTION

The present invention relates to a circuit for weighted addition.

BACKGROUND OF THE INVENTION

Conventionally, a digital circuit for weighted addition has been large in size, and an analog circuit for it has been imprecise.

SUMMARY OF THE INVENTION

The present invention is invented so as to solve the above conventional problems, and has an object to provide a precision circuit for weighted addition which is small in size and easily realizes various types of calculation.

The circuit for weighted addition of the present invention commonly outputs the balanced voltage of parallel resistances.

"A" shows a circuit Cot weighted addition, from "$R_1$" to $R_3$" show resistances, "$V_4$" shows output voltage, from "$V_1$" to "$V_3$" show input voltage, "C" shows a capacitance, from "$i_1$" to "$i_3$" show electric current, "Tr" show a field effect transistor, "Vcc" shows a power source.

PREFERRED EMBODIMENT OF THE PRESENT INVENTION

Hereinafter an embodiment of a circuit for weighted addition according to the present invention is described with reference to the attached drawings.

Figure 1:
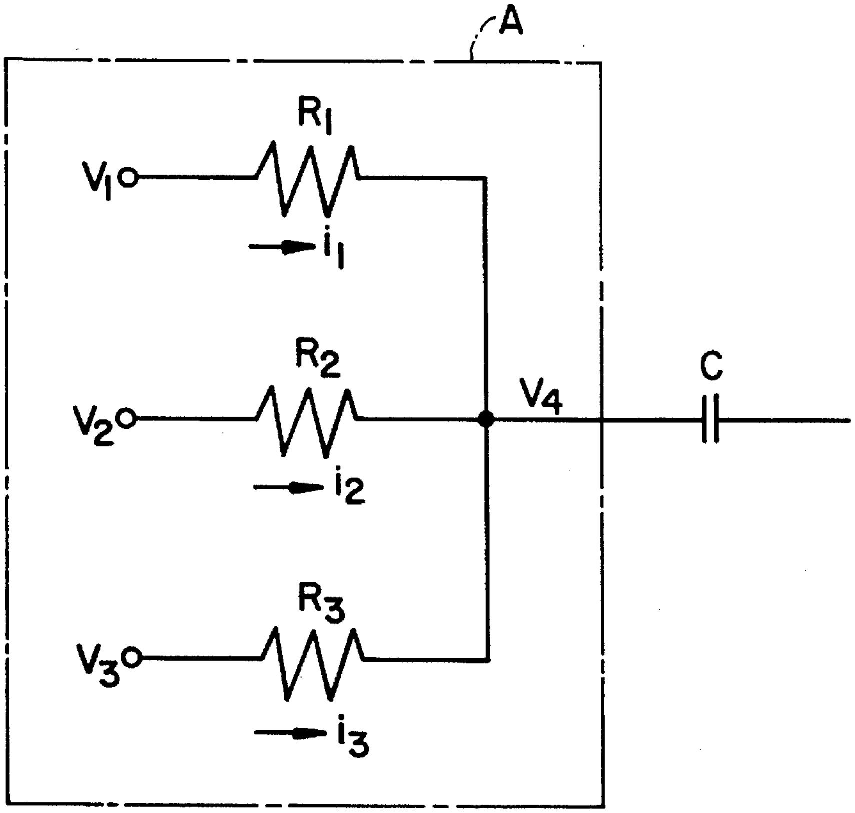
FIG. 1 shows an embodiment of a circuit for weighted addition of the present invention.

In FIG. 1, a circuit for weighted addition "A" comprises a plural number of resistances $R_1$, $R_2$ and $R_3$ connected in parallel to the common output (represented by output voltage $V_1$). Another terminal of $R_1$, $R_2$ and $R_3$ is impressed with input voltages $V_1$, $V_2$ and $V_3$, respectively. The common output of the circuit for weighted addition is connected to the following circuit (not shown in the figure) through capacitance "C".

Representing the electrical current of $R_1$, $R_2$ and $R_3$ by $i_1$, $i_2$ and $i_3$, respectively, the formulas from (1) to (4) are true.

$$i_1=(V_1-V_4)/R_1 \quad (1)$$

$$i_2=(V_2-V_4)/R_2 \quad (2)$$

$$i_3=(V_3-V_4)/R_3 \quad (3)$$

$$i_1+i_2+i_3=0 \quad (4)$$

Representing the admittances corresponding to $R_1$ to $R_3$ by $a_1$ to $a_3$, respectively, the relationship in (5) is true.

$$a_1=1/R_1,\ a_2=1/R_2,\ a_3=1/R_3 \quad (5)$$

$V_4$ can be expressed as in (6).

$$V_4=(a_1V_1+a_2V_2+a_3V_3)/(a_1+a_2+a_3) \quad (6)$$

The formula in (6) shows that it is equivalent to the weighted addition with respect to $V_1$ to $V_3$.

Figure 3A:
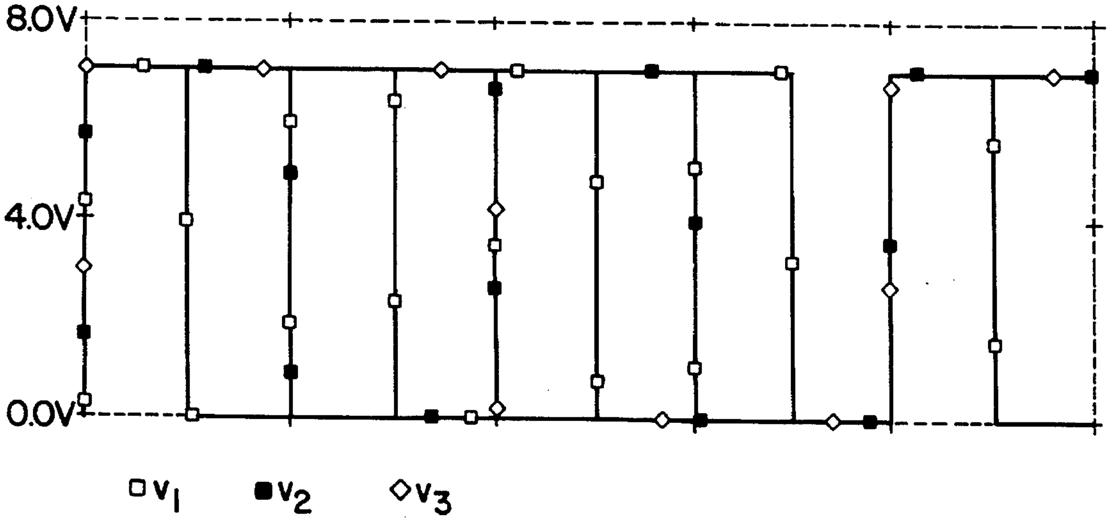
FIGS. 3(*a*) and 3(*b*) show the relationship of the change of $V_1$ to $V_3$ and $V_4$.
Figure 3B:
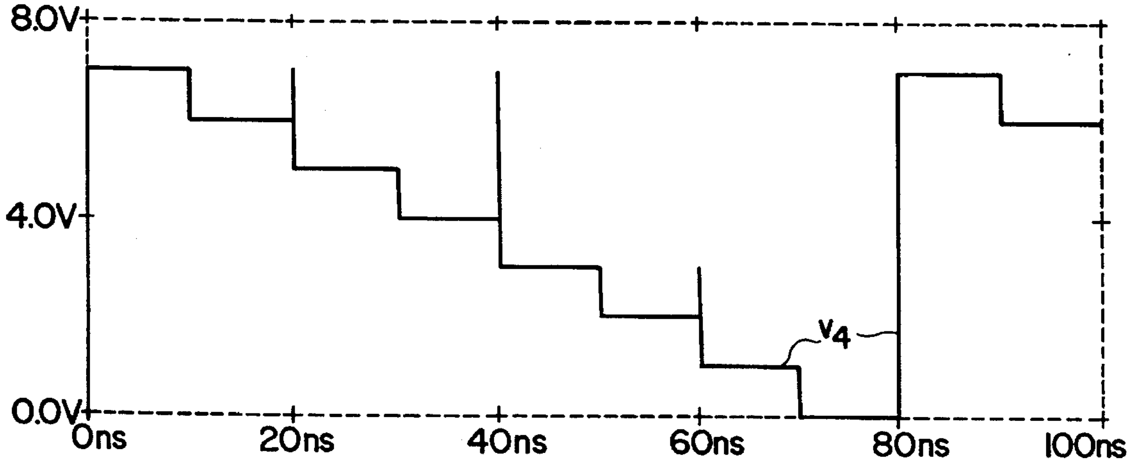

When the circuit in FIG. 1 is simulated by an analog simulator, time result is shown in FIGS. 3(*a*) and FIG. 3(*b*). According to the change of $V_1$ to $V_3$, $V_4$ is always the weighted addition.

Figure 4:
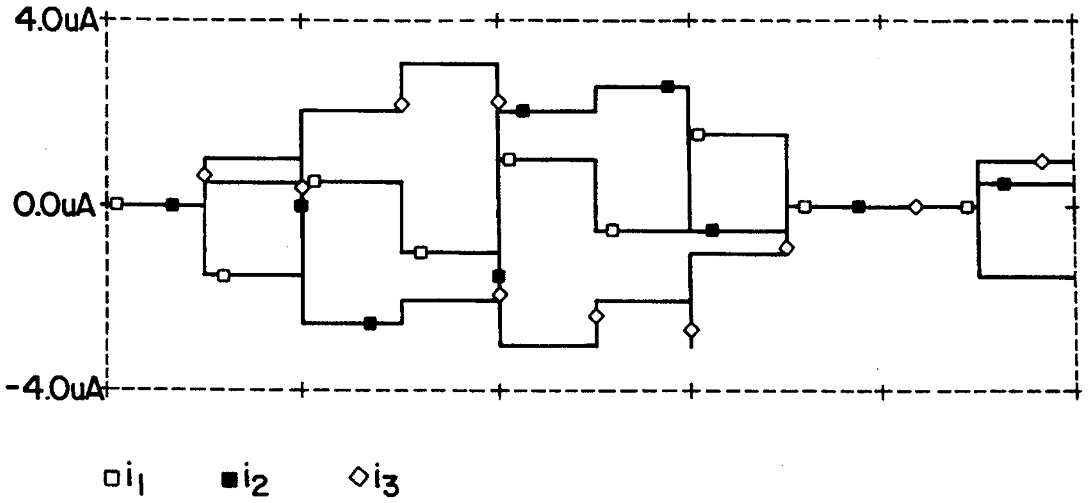
FIG. 4 shows electric current $i_1$ to $i_3$ corresponding to FIG. 3 (*a*) and (*b*).

FIG. 4 shows the simulation off the electrical current from $i_1$ to $i_3$, corresponding to FIGS. 3(*a*) and 3(*b*). As the electrical currents $i_1$ to $i_3$ are very small, the amount of electrical power is consumed is also small.

As it is clear from the condition in formula (4), high resistance or other elements of very small electrical current can be adopted as the following step of "A" of circuit, for weighted addition.

Figure 2:
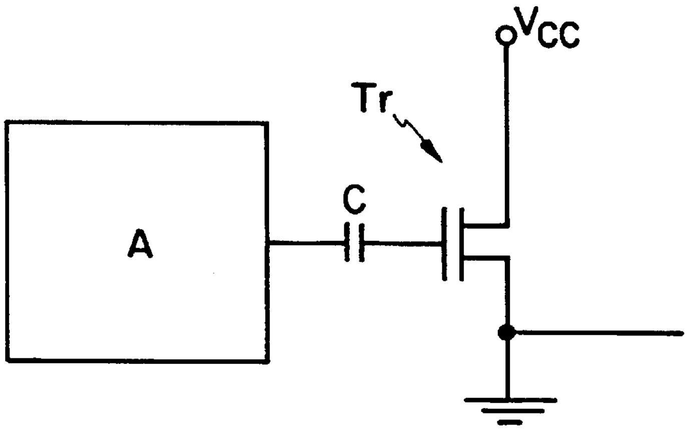
FIG. 2 shows a variation of the first embodiment.

FIG. 2 shows another following circuit adapted In such a condition. In this circuit, the output of "A" of the circuit for weighted addition is connected to the gate of "Tr" or the field effect transistor, and gate Tr control is possible according to weighted addition.

Rewriting formula (6) into the general one for the necessary number of resistances, formula (7) can be obtained.

$$V_4=\sum_{1=l}^{n} a_1V_1/\sum_{1=l}^{n} a_1 \quad (7)$$

As mentioned above, it is possible to perform weighted addition precisely with a small size and also possible to perform various types of calculation, easily, using the circuit for weighted addition of the present invention because it adopts balanced voltage in parallel resistances as a common output.

What is claimed is:

1. A circuit for weighted addition comprising:

a field effect transistor having a first terminal and a second terminal, said first terminal being a gate of said field effect transistor and said second terminal providing an output signal representative of a weighted addition sum;

a plurality of resistance elements, each resistance element having a first and second end, the first end of each resistance element impressed with a voltage representative of an addend of said weighted addition, the resistance of each resistance element being indicative of a weight to be applied to its respective voltage, and the second end of each resistance element connected to the gate of the field effect transistor for providing a signal representative of the resistance element's respective addend after weighting; and a capacitor connected between the gate of the field effect transistor and the second end of each resistance element.

2. The circuit of claim 1, said capacitor electrically partitioning said resistance elements from said transistor.

3. The circuit of claim 1, wherein a current draw through one of said resistance elements is proportional to a voltage applied to a first end of said resistance element.

4. The circuit of claim 1, wherein a current draw through each of said resistance elements is proportional to a voltage applied to a first end of that resistance element.

5. The circuit of claim 1, wherein a current draw through a first one of said resistance elements is proportional to a voltage applied to a first end of a second one of said resistance elements.

6. The circuit of claim 1, wherein a current draw through each of said resistance elements is proportional to a voltage applied to a first end of a different one of said resistance elements.

7. The circuit of claim 1, wherein a current draw through a first one of said resistance elements is proportional to voltages applied to a first end of each of all other resistance elements.

8. The circuit of claim 1, wherein a current flow through each of said resistance elements is proportional to voltages applied to a first end of each of all other resistance elements.

9. The circuit of claim 1, wherein an average current flow, over a range of all possible combinations of input voltages to said resistance elements, through a resistance element representative of a least significant addend is proportional to said weighted sum.

10. A circuit for controlling the gate of a field effect transistor comprising:

a field effect transistor having a first terminal and a second terminal, said first terminal being a gate and said second terminal providing an output signal representative of a weighted addition sum;

weight addition control means for receiving a plurality of voltages, for performing a weighted addition of the voltages, and for controlling the gate of the field effect transistor based on the weighted addition of the voltages, said weight addition control means including a plurality of resistance elements connected in parallel; and a capacitor connected between the gate of the transistor and the weight addition control means.

11. The circuit of claim 10, said capacitor electrically partitioning said resistance elements from said transistor.

12. The circuit of claim 10, wherein:

a first end of each resistance element is impressed with a voltage representative of an addend of said weighted addition;

the resistance of said each resistance element is indicative of a weight to be applied to its respective voltage; and a second end of said each resistance element is connected to the gate of the field effect transistor for providing a signal representative of the resistance element's respective addend after weighting.

13. The circuit of claim 10, wherein a current draw through one of said resistance elements is proportional to a voltage applied to a first end of said resistance element.

14. The circuit of claim 10, wherein a current draw through each of said resistance elements is proportional to a voltage applied to a first end of that resistance element.

15. The circuit of claim 10, wherein a current draw through a first one of said resistance elements is proportional to a voltage applied to a first end of a second one of said resistance elements.

16. The circuit of claim 10, wherein a current draw through each of said resistance elements is proportional to a voltage applied to a first end of a different one of said resistance elements.

17. The circuit of claim 10, wherein a current draw through a first one of said resistance element is proportional to voltages applied to a first end of each of all other resistance elements.

18. (New) The circuit of claim 10, wherein a current flow through each of said resistance elements is proportional to voltages applied to a first end of each of all other resistance elements.

19. The circuit of claim 10, wherein an average current flow, over a range of all possible combinations of input voltages to said resistance elements, through a resistance element representative of a least significant addend is proportional to said weighted sum.

20. A circuit for weighted addition comprising:

a field effect transistor having a first terminal and a second terminal, said first terminal being a gate and said second terminal providing an output signal representative of a weighted addition sum;

a plurality of resistance elements, each resistance element having a first and second end, the first end of each resistance element impressed with a voltage representative of an addend of said weighted addition, the resistance of each resistance element being indicative of a weight to be applied to its respective voltage, and the second end of each resistance element connected to the gate of the transistor for providing a signal representative of the resistance element's respective addend after weighting; and a capacitor connected between the gate of the transistor and the second end of each resistance element.

21. The circuit of claim 20, said capacitor electrically partitioning said resistance elements from said transistor.

22. The circuit of claim 20, wherein a current draw through one of said resistance elements is proportional to a voltage applied to a first end of said resistance element.

23. The circuit of claim 20, wherein a current draw through each of said resistance elements is proportional to a voltage applied to a first end of that resistance element.

24. The circuit of claim 20, wherein a current draw through a first one of said resistance elements is proportional to a voltage applied to a first end of a second one of said resistance elements.

25. The circuit of claim 20, wherein a current draw through each of said resistance elements is proportional to a voltage applied to a first end of a different one of said resistance elements.

26. The circuit of claim 20, wherein a current draw through a first one of said resistance element is proportional to voltages applied to a first end of each of all other resistance elements.

27. The circuit of claim 20, wherein a current flow through each of said resistance elements is proportional to voltages applied to a first end of each of all other resistance elements.

28. The circuit of claim 20, wherein an average current flow, over a range of all possible combinations of input voltages to said resistance elements, through a resistance element representative of a least significant addend is proportional to said weighted sum.

* * * * *